(12) United States Patent
Yoon et al.

(10) Patent No.: US 8,436,651 B2
(45) Date of Patent: May 7, 2013

(54) COMMAND CONTROL CIRCUIT FOR SEMICONDUCTOR INTEGRATED DEVICE

(75) Inventors: Hyun-Su Yoon, Gyeonggi-do (KR); Jong-Chern Lee, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 52 days.

(21) Appl. No.: 12/624,144

(22) Filed: Nov. 23, 2009

(65) Prior Publication Data

US 2011/0001514 A1    Jan. 6, 2011

(30) Foreign Application Priority Data

Jul. 2, 2009    (KR) .................. 10-2009-0060080

(51) Int. Cl.
*G06F 7/38* (2006.01)
(52) U.S. Cl.
USPC .......................................................... 326/46
(58) Field of Classification Search .............. 326/37–41, 326/46, 47, 101, 93
See application file for complete search history.

(56) References Cited

U.S. PATENT DOCUMENTS

| 6,590,616 | B1 * | 7/2003 | Takeuchi | 348/572 |
|---|---|---|---|---|
| 7,102,407 | B2 * | 9/2006 | Slawecki | 327/263 |
| 7,256,618 | B2 * | 8/2007 | Nishikawa | 326/93 |
| 2007/0103201 | A1 * | 5/2007 | Lau et al. | 326/93 |
| 2009/0027097 | A1 * | 1/2009 | Kanno et al. | 327/208 |

FOREIGN PATENT DOCUMENTS

KR    1020070075572    7/2007

OTHER PUBLICATIONS

Notice of Allowance issued from Korean Intellectual Property Office on Feb. 20, 2011.

* cited by examiner

*Primary Examiner* — Thienvu Tran
(74) *Attorney, Agent, or Firm* — IP & T Group LLP

(57) ABSTRACT

A command control circuit of a semiconductor integrated device includes a plurality of latches sequentially connected and receiving a command signal, and a plurality of selection switches configured to pass or to interrupt the command signal inputted to each one of the plurality of latches.

21 Claims, 4 Drawing Sheets

COMMAND CONTROL CIRCUIT FOR SEMICONDUCTOR INTEGRATED DEVICE

CROSS-REFERENCE TO RELATED APPLICATION

The present application claims priority of Korean Patent Application No. 10-2009-0060080, filed on Jul. 2, 2009, which is incorporated herein by reference in its entirety.

BACKGROUND OF THE INVENTION

Exemplary embodiments of the present invention relate to a semiconductor integrated device, and more particularly, to a command control circuit for synchronizing a command signal with a clock and outputting the synchronized command signal.

Conventional electronic devices include semiconductor integrated devices (a circuit). For example, a personal computer, a television set, an audio device, and a communication device include semiconductor integrated devices. The semiconductor integrated devices receive data from other electronic devices or electronic elements, store the received data, and provide the stored data to other electronic devices or electronic elements.

Such a semiconductor integrated device performs an operation in response to a command and an address command generated from an external memory controller. The semiconductor integrated device controls related operations by synchronizing the command and the address command to a clock. Therefore, the semiconductor integrated device internally performs a process of synchronizing an input signal to a clock signal.

FIG. 1 is a diagram illustrating a command control circuit used in a semiconductor integrated device according to the related art.

As shown in FIG. 1, the command control circuit according to the related art is configured to synchronize a command signal CMD that is input to a clock signal CLOCK using a plurality of latches 10 to 18. That is, the command control circuit according to the related art includes a plurality of latches 10 to 18. Each of the plurality of latches 10 to 18 includes a clock end CE for receiving a clock signal, an input end D for receiving an input signal, and an output end Q for outputting a latched signal. The input end D of the first latch 10 receives a command signal CMD. The input end D of the next latch 12 receives an output signal from output end Q of the previous latch 10 as an input signal. Accordingly, the input signal passes sequentially through the plurality of latches.

The output end Q of each latch 10 to 16 is connected to the input end D of the next latch and also connected to an output terminal OUT through selection switches 20-26. The output end Q of latch 18 is connected to the output terminal OUT through selection switch 28. The selection switches 20 to 28 are configured to be controlled in response to selection control signals SELECT<0> to SELECT<4> from a controller (not shown).

FIG. 2 is a diagram illustrating one of the plurality of latches illustrated in FIG. 1. That is, each one of the latches 10 to 18 includes two three-phase inverters 50 and 52. An input end of one of the three phase inverters is connected to an output end of the other. The input signal provided to input end D passes through the three phase inverters 50 and 52 during an enable period when a clock signal CLOCK is in a logic low state and inverted and outputted from an inverter 60.

In the command control circuit according to the related art, a command signal CMD is inputted to the first latch 10 among the plurality of latches and synchronized with a clock signal. Then, the synchronized signal is transferred to the second latch 12. The synchronized command passes sequentially from the second latch 12 to the last latch 18 by the above described operation.

The controller (not shown) enables a selection switch connected to an output end of a corresponding latch to output only an output signal of a latch delayed by the desired number of clocks among the output signals of the plurality of latches 10 to 18. The output signal passes through the selection switch and is outputted through the output terminal OUT.

For example, in case of delaying a signal by two clocks, a command signal CMD is inputted to the first latch 10. The first latch 10 delays the command signal by one clock and outputs the one clock delayed command signal. The one clock delayed command signal from the first latch 10 is transferred to the second latch 12. The second latch 12 delays the received command signal by one clock again. Then, the selection switch 22 is enabled to transfer the output signal of the second latch 12 to the output terminal OUT. For example, in case of delaying a signal by three clocks, a command signal CMD is inputted to the first latch 10. The first latch 10 delays the command signal by one clock. The first latch 10 outputs one clock delayed command signal to the second latch 12. The second latch 12 delays the command signal by one clock again. Then, the second latch 12 outputs the delayed command signal to the third latch 14 and the third latch 14 delays the command signal by one clock again. Then, the selection switch 24 is enabled to transfer the output signal of the third latch 14 to the output terminal OUT.

As shown, all output ends Q of the latches 10 to 18 are connected to one output terminal OUT in the command control circuit of the semiconductor integrated device according to the related art. Accordingly, significant load is applied to the output terminal OUT. Due to the significant load, an output signal of each latch may not be accurately outputted at a desired time. As a result, unnecessary delay may be generated.

SUMMARY OF THE INVENTION

An embodiment of the present invention is directed to a command control circuit of a semiconductor integrated device for reducing load at an output node when a command signal is synchronized with a clock signal and outputted.

In accordance with an embodiment of the present invention, a command control circuit of a semiconductor integrated device including a plurality of latches that are sequentially connected and configured to receive a command signal; and a plurality of selection switches configured to pass or to interrupt the command signal inputted to each one of the plurality of latches.

In accordance with another embodiment of the present invention, a command control circuit of a semiconductor integrated device including a plurality of latches, wherein one latch of the plurality of latches includes a first input end configured to receive a command, and the other ones of the plurality of latches each include a first input end configured to receive a command signal and a second input end configured to receive an output signal of a previous latch wherein an output end of the last latch of the latches outputs a desired pulse signal; a plurality of selection switches connected between a command signal input line and the first input end of a respective one of the plurality of the latches; a controller configured to enable one of the plurality of selection switches to output pulse.

In accordance with yet another embodiment of the present invention, a command control circuit of a semiconductor integrated device, including a plurality of latches that are sequentially connected and configured to receive a command signal; and a controller configured to control the plurality of latches to generate a signal delayed by the number of desired clocks to delay by controlling input signals of the plurality of latches.

DESCRIPTION OF SPECIFIC EMBODIMENTS

Figure 1:
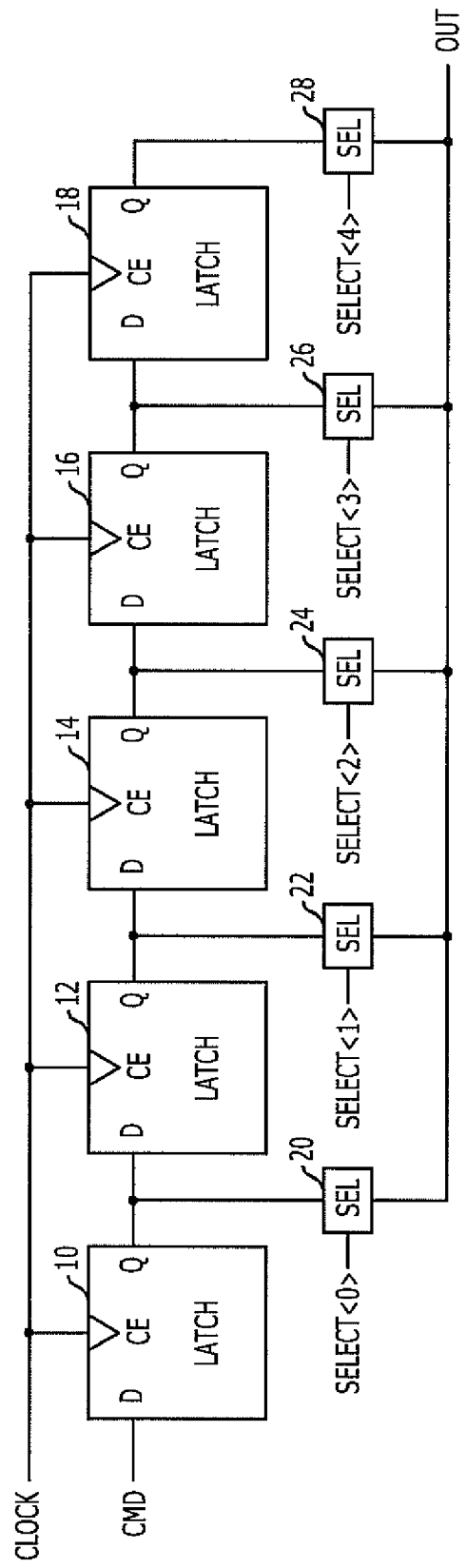
FIG. 1 is a diagram illustrating a command control circuit of a semiconductor integrated device according to the related art.
Figure 2:
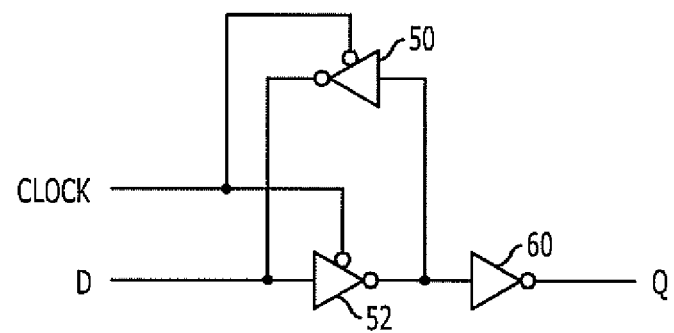
FIG. 2 is a diagram illustrating one of a plurality of latches shown in FIG. 1.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
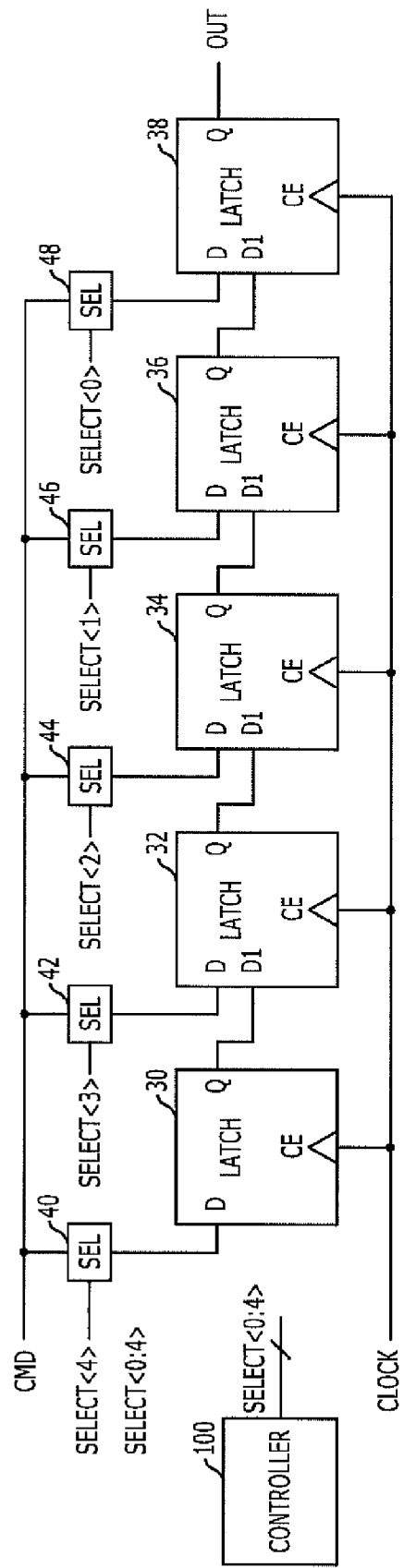
FIG. 3 is a diagram illustrating a command control circuit of a semiconductor integrated device in accordance with an exemplary embodiment of the present invention.

FIG. 3 is a diagram illustrating a command control circuit of a semiconductor integrated device in accordance with an exemplary embodiment of the present invention.

As illustrated in FIG. 3, the command control circuit according to the exemplary embodiment provides a command signal to a plurality of latches. The command control circuit according to the exemplary embodiment controls output ends of the plurality of latches not to be connected to a final output node in order to delay the command signal by the desired number of clocks and output the delayed command signal. That is, as illustrated in FIG. 3, the final output node is connected to the last latch among the plurality of latches in order to minimize output loading. Hereinafter, the command control circuit according to the exemplary embodiment will be described in detail.

The command control circuit according to the exemplary embodiment includes a plurality of latches 30 to 38. The command control circuit according to the exemplary embodiment is configured to provide a command signal CMD to all input ends D of the plurality of latches 30 to 38. Further, the command control circuit according to the exemplary embodiment is configured to control providing the command signal to each one of the plurality of latches 30 to 38 using a controller 100. That is, the controller 100 controls selection switches 40 to 48 by generating selection control signals SELECT<0> to SELECT<4> to control providing a command signal to each latch. The controller 100 is disposed inside or outside the semiconductor integrated device and is configured to control operations.

The plurality of latches 30 to 38 are sequentially connected. An output end Q of a latch is connected to an input end D1 of a next latch. An output end Q of the last latch 38 is connected to an output terminal OUT. A clock signal CLOCK is inputted to clock ends CE of the plurality of latches 30 to 38.

Figure 4:
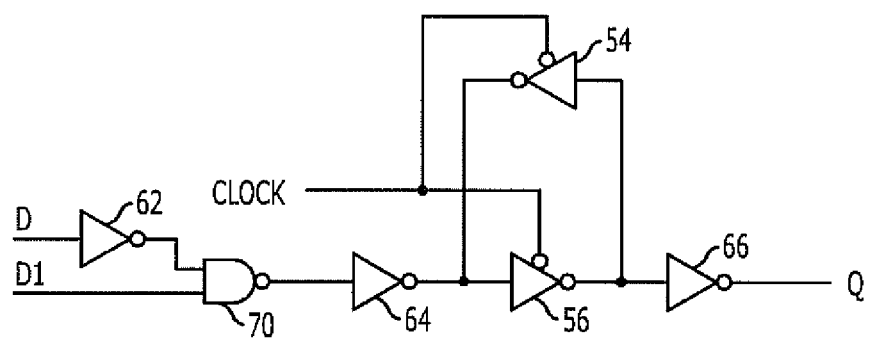
FIG. 4 is a diagram illustrating one of a plurality of latches in accordance with an exemplary embodiment of the present invention.

FIG. 4 is a diagram illustrating a latch in accordance with an exemplary embodiment of the present invention.

Referring to FIG. 4, each one of the plurality of latches 32 to 38 according to the exemplary embodiment includes an input end D for receiving a command signal CMD and an input end D1 for receiving an output signal from the output end Q of a previous latch. Each one of the plurality of latches 32 to 38 according to the exemplary embodiment further includes an inverter 62 for inverting the command signal CMD from the input end D and a NAND gate 70 for performing a NAND operation on the inverted command signal and the input signal D1. Each one of the plurality of latches 32 to 38 according to the exemplary embodiment further includes an inverter 64 for receiving the output signal of the NAND gate 70 and inverting the received signal, a latch unit formed of two three phase inverters 54 and 56 for latching the inverted signal from the inverter 64 and outputting a latch signal, and an inverter 66 for receiving the latch signal from the latch unit, inverting the latched signal, and outputting the inverted signal. The latch unit is formed of two three-phase inverters 54 and 56. An input end of one of the two three-phase inverters is connected to an output end of the other. The latch unit receives the inverted signal from the inverter 64, latches the received signal through the three phase inverters 54 and 56, and outputs the latch signal.

Hereinafter, an operation of a command control circuit of a semiconductor integrated device in accordance with an exemplary embodiment of the present invention will be described.

In the command control circuit according to the exemplary embodiment, a command signal CMD is provided to all latches 30 to 38 as illustrated in FIG. 3. That is, the command signal CMD is provided to all latches 30 to 38 as input and the controller 100 enables latches corresponding to the desired delay clock number to receive the command signal CMD.

For example, when the controller 100 enables a selection switch 42 that passes the command signal CMD to the second latch 32, the command signal CMD is inputted to the second latch 32. Then, the second latch 32 synchronizes the command signal CMD with a clock signal and outputs the synchronized command signal. The inputted command signal CMD is converted to a pulse signal through the NAND gate 70 and the inverter 64 in the second latch 32. The pulse signal is inputted to the latch unit formed of two three-phase inverters 54 and 56. The latch unit is enabled while a clock signal CLOCK is in a logic low state period and latches the pulse signal. The inverter 66 inverts the latch signal from the latch unit and outputs the inverted latch signal.

The output signal of the inverter 66 is transferred to the next latch 34. In performing the foregoing steps, the CMD command signal is inputted to the latch 32 through the enabled selection switch 42. The latch 32 synchronizes the command signal with a clock signal and transfers the synchronized command signal to the next latch 34. The latch 34 delays the command signal by one clock through synchronizing the command signal with a clock signal again. Then, the latch 34 outputs the delayed signal. The synchronized command signal passes sequentially through latches until the last latch 38. The command control circuit according to the exemplary embodiment finally outputs the synchronized command signal outputted from last latch 38 through the output terminal OUT. As described above, the command control circuit according to the exemplary embodiment delays the command signal CMD by the desired delay clock number and outputs the delayed command signal.

That is, the signal delayed from the second latch 32 to the last latch 38 is outputted through the final output terminal OUT without being unexpectedly delayed due to output load of an output end of each latch. It is because the final output terminal OUT is connected to the last latch 38 only without being connected to an output end Q of each latch.

For example, when one clock delay is required, the controller enables a selection switch that passes a command signal CMD to the latch 38 connected to the final output terminal OUT. When two clock delay is required, the controller enables a selection switch that passes a command signal CMD to a latch 36 so as to place two latches to the final output terminal OUT. As described above, the controller enables a selection switch connected to a corresponding latch in order to output only an output signal of a latch delayed by the desired number of clocks among output signals of the plurality of latches 30 to 38. Accordingly, an output signal is outputted through the output terminal OUT by use of an appropriate selection switch as described above.

As described above, the command control circuit according to the exemplary embodiment delays a command signal CMD by the desired number of clocks and provides the delayed command signal by controlling inputs of a plurality of latches for clock delay. Further, since a final output terminal OUT is connected to the last latch only, output loading is minimized.

While the present invention has been described with respect to the specific exemplary embodiments, it will be apparent to those skilled in the art that various changes and modifications may be made without departing from the spirit and scope of the invention as defined in the following claims.

What is claimed is:

1. A command control circuit of a semiconductor integrated device, comprising:
    a plurality of latches sequentially connected to one another and configured to commonly receive a command signal through a first data input terminal; and
    a plurality of selection switches configured to selectively couple the command signal to each one of the plurality of latches,
    wherein a second latch to a last latch of the plurality of latches are configured to receive the command signal as a first input signal through the first data input terminal and configured to receive an output signal of a previous latch as a second input signal through a second data input terminal.

2. The command control circuit of claim 1, wherein an output signal of the plurality of latches is outputted from the last latch among the plurality of latches.

3. The command control circuit of claim 1, wherein the second latch to the last latch of the plurality of latches include:
    a pulse generator configured to generate a pulse signal using the command signal;
    a latch unit configured to latch the generated pulse signal; and
    an output unit configured to output a latch signal of the latch unit.

4. The command control circuit of claim 3, wherein the pulse generator includes operators that generate the pulse signal having a predetermined magnitude by combining the first and second input signals.

5. The command control circuit of claim 3, wherein the latch unit includes two three-phase inverters and the two three-phase inverters are enabled by a clock signal.

6. The command control circuit of claim 3, wherein the output unit includes an inverter.

7. A command control circuit of a semiconductor integrated device, comprising:
    a plurality of latches, wherein one of the latches includes a first input end configured to receive a command signal as an input signal, and wherein other ones of the plurality of latches each include a first input end configured to receive the command signal as a first input signal and a second input end configured to receive an output signal of a previous latch as a second input signal, wherein an output end of the last of the latches outputs a desired pulse signal;
    a plurality of selection switches connected between a command signal input line and the first input end of a respective one of the plurality of latches; and
    a controller configured to enable one of the plurality of selection switches to output a pulse.

8. The command control circuit of claim 7, wherein each of the plurality of latches is configured to output a latched signal synchronized with a clock signal.

9. The command control circuit of claim 7, wherein each one of the plurality of latches includes:
    a pulse generator configured to generate a pulse signal using the command signal;
    a latch unit configured to latch the generated pulse signal; and
    an output unit configured to output a latch signal of the latch unit.

10. The command control circuit of claim 9, wherein the pulse generator includes operators for generating the pulse signal having a predetermined magnitude by combining the first and second input signals.

11. The command control circuit of claim 9, wherein the latch unit includes two three-phase inverters, and the two three-phase inverters are enabled by a clock signal.

12. The command control circuit of claim 9, wherein the output unit includes an inverter.

13. The command control circuit of claim 7, wherein the selection switches provide the command signal to the latches in response to a control signal from the controller.

14. The command control circuit of claim 7, wherein the controller sequentially controls the plurality of latches from the last latch in proportion to the number of clocks to delay.

15. A command control circuit of a semiconductor integrated device, comprising:
    a plurality of latches sequentially connected to one another and configured to commonly receive a command signal through a data input terminal; and
    a controller configured to control the plurality of latches to generate a signal delayed by the number of desired clocks to delay by controlling input signals of the plurality of latches,
    wherein a second latch to a last latch of the plurality of latches are configured to receive the command signal as a first input signal through the first data input terminal and configured to receive an output signal of a previous latch as a second input signal through a second data input terminal.

16. The command control circuit of claim 15, further comprising:
    a plurality of selection switches connected between the plurality of latches and a command signal input line,
    wherein the controller controls an enabling operation of the plurality of selection switches.

17. The command control circuit of claim 16, wherein the selection switches provide the command signal to the latches in response to a control signal from the controller.

18. The command control circuit of claim 15, wherein at least one of the plurality of latches includes:
- a pulse generator configured to generate a pulse signal using the command signal;
- a latch unit configured to latch the generated pulse signal; and
- an output unit configured to output a latch signal of the latch unit.

19. The command control circuit of claim 18, wherein the latch unit includes two three-phase inverters and the two three-phase inverters are enabled by a clock signal.

20. The command control circuit of claim 15, wherein the controller sequentially controls the plurality of latches from the last latch in proportion to the number of desired clocks to delay.

21. The command control circuit of claim 18, wherein a second latch to a last latch of the plurality of latches each include:
- a pulse generator configured to generate a pulse signal using the command signal;
- a latch unit configured to latch the generated pulse signal; and
- an output unit configured to output a latch signal of the latch unit.

* * * * *